United States Patent
Edwards et al.

(10) Patent No.: US 8,694,896 B2
(45) Date of Patent: *Apr. 8, 2014

(54) ONLINE STORY COLLABORATION

(75) Inventors: Eric Edwards, San Francisco, CA (US); Clay Harvey Fisher, Belmont, CA (US); Kurt Jonach, San Jose, CA (US); Neal Jacob Manowitz, Woodcliff Lake, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 724 days.

This patent is subject to a terminal disclaimer.

(21) Appl. No.: 12/870,583

(22) Filed: Aug. 27, 2010

(65) Prior Publication Data

US 2010/0325558 A1    Dec. 23, 2010

Related U.S. Application Data

(63) Continuation of application No. 09/632,535, filed on Aug. 4, 2000, now Pat. No. 7,810,037.

(60) Provisional application No. 60/181,841, filed on Feb. 11, 2000.

(51) Int. Cl.
*G06F 3/00* (2006.01)

(52) U.S. Cl.
USPC ............ 715/752; 715/749; 715/750; 715/751

(58) Field of Classification Search
USPC .................. 257/737, 738, E21.506; 438/121; 715/751, 749, 750, 752
See application file for complete search history.

(56) References Cited

U.S. PATENT DOCUMENTS

| 3,785,721 | A |   | 1/1974  | Harsch |
|-----------|---|---|---------|--------|
| 4,305,131 | A |   | 12/1981 | Best |
| 5,100,154 | A | * | 3/1992  | Mullins .......................... 273/429 |
| 5,111,410 | A |   | 5/1992  | Nakayama et al. |
| 5,293,619 | A | * | 3/1994  | Dean ...................................... 1/1 |
| 5,303,148 | A |   | 4/1994  | Mattson et al. |
| 5,327,521 | A |   | 7/1994  | Savic et al. |
| 5,337,407 | A | * | 8/1994  | Bates et al. .................... 715/751 |
| 5,388,196 | A | * | 2/1995  | Pajak et al. ..................... 715/751 |
| 5,477,264 | A |   | 12/1995 | Sarbadhikari et al. |
| 5,559,707 | A |   | 9/1996  | DeLorme et al. |
| 5,600,765 | A |   | 2/1997  | Ando et al. |
| 5,615,123 | A |   | 3/1997  | Davidson et al. |

(Continued)

FOREIGN PATENT DOCUMENTS

JP          11-119688          4/1999

OTHER PUBLICATIONS

No Author Known, "Game Commander User's Guide," Mindmaker, Inc., Version 1.0, 9 pp., 1998.

(Continued)

*Primary Examiner* — Linh K Pham
(74) *Attorney, Agent, or Firm* — Blakely, Sokoloff, Taylor & Zafman LLP

(57) ABSTRACT

An online collaborative story system allows multiple people to collaborate on creating a story by contributing content of various types to a server computer, where it is voted on by the collaborators or a designated editor to create the finished story. Additionally, one or more of the collaborators can be rewarded for their participation in the story.

21 Claims, 5 Drawing Sheets

(56) References Cited

U.S. PATENT DOCUMENTS

| | | | | |
|---|---|---|---|---|
| 5,633,678 | A | 5/1997 | Parulski et al. | |
| 5,634,012 | A | 5/1997 | Stefik et al. | |
| 5,643,088 | A | 7/1997 | Vaughn et al. | |
| 5,657,992 | A * | 8/1997 | Bellizzi | 273/273 |
| 5,679,075 | A | 10/1997 | Forrest et al. | |
| 5,682,525 | A | 10/1997 | Bouve et al. | |
| 5,710,887 | A | 1/1998 | Chelliah et al. | |
| 5,721,827 | A | 2/1998 | Logan et al. | |
| 5,727,093 | A | 3/1998 | Uchiyama et al. | |
| 5,727,201 | A | 3/1998 | Burke | |
| 5,732,216 | A | 3/1998 | Logan et al. | |
| 5,737,538 | A | 4/1998 | Wilhite | |
| 5,740,549 | A | 4/1998 | Reilly et al. | |
| 5,748,898 | A | 5/1998 | Ueda | |
| 5,760,916 | A | 6/1998 | Dellert et al. | |
| 5,768,142 | A | 6/1998 | Jacobs | |
| 5,768,528 | A | 6/1998 | Stumm | |
| 5,771,354 | A | 6/1998 | Crawford | |
| 5,781,665 | A | 7/1998 | Cullen et al. | |
| 5,781,915 | A * | 7/1998 | Kohno et al. | 715/234 |
| 5,794,006 | A | 8/1998 | Sanderman | |
| 5,802,292 | A | 9/1998 | Mogul | |
| 5,819,092 | A | 10/1998 | Ferguson et al. | |
| 5,845,062 | A | 12/1998 | Branton, Jr. et al. | |
| 5,845,281 | A | 12/1998 | Benson et al. | |
| 5,852,450 | A | 12/1998 | Thingvold | |
| 5,855,516 | A | 1/1999 | Eiba | |
| 5,857,074 | A | 1/1999 | Johnson | |
| 5,864,329 | A | 1/1999 | Hirokawa et al. | |
| 5,867,799 | A * | 2/1999 | Lang et al. | 1/1 |
| 5,872,637 | A | 2/1999 | Nakanishi | |
| 5,880,778 | A | 3/1999 | Akagi | |
| 5,881,168 | A | 3/1999 | Takaoka et al. | |
| 5,884,280 | A | 3/1999 | Yoshioka et al. | |
| 5,889,868 | A | 3/1999 | Moskowitz et al. | |
| 5,918,009 | A | 6/1999 | Gehani et al. | |
| 5,923,846 | A | 7/1999 | Gage et al. | |
| 5,937,392 | A | 8/1999 | Alberts | |
| 5,940,600 | A | 8/1999 | Staats et al. | |
| 5,940,806 | A | 8/1999 | Danial | |
| 5,942,969 | A | 8/1999 | Wicks | |
| 5,944,769 | A | 8/1999 | Musk et al. | |
| 5,948,040 | A | 9/1999 | DeLorme et al. | |
| 5,948,061 | A | 9/1999 | Merriman et al. | |
| 5,949,875 | A | 9/1999 | Walker et al. | |
| 5,960,409 | A | 9/1999 | Wexler | |
| 5,963,664 | A | 10/1999 | Kumar et al. | |
| 5,968,120 | A | 10/1999 | Guedalia | |
| 5,970,143 | A | 10/1999 | Schneier et al. | |
| 5,974,451 | A | 10/1999 | Simmons | |
| 5,982,891 | A | 11/1999 | Ginter et al. | |
| 5,982,944 | A | 11/1999 | Vaidyanathan et al. | |
| 5,983,200 | A | 11/1999 | Slotznick | |
| 6,005,548 | A | 12/1999 | Latypov et al. | |
| 6,005,987 | A | 12/1999 | Nakamura et al. | |
| 6,006,197 | A | 12/1999 | d'Eon et al. | |
| 6,006,231 | A | 12/1999 | Popa | |
| 6,011,537 | A | 1/2000 | Slotznick | |
| 6,014,681 | A | 1/2000 | Walker et al. | |
| 6,014,701 | A | 1/2000 | Chaddha | |
| 6,018,761 | A | 1/2000 | Uomini | |
| 6,021,433 | A | 2/2000 | Payne et al. | |
| 6,023,701 | A | 2/2000 | Malik et al. | |
| 6,026,371 | A | 2/2000 | Beck et al. | |
| 6,035,323 | A | 3/2000 | Narayen et al. | |
| 6,041,316 | A | 3/2000 | Allen | |
| 6,044,181 | A | 3/2000 | Szeliski et al. | |
| 6,052,600 | A * | 4/2000 | Fette et al. | 455/509 |
| 6,058,379 | A | 5/2000 | Odom et al. | |
| 6,058,428 | A | 5/2000 | Wang et al. | |
| 6,067,095 | A | 5/2000 | Danieli | |
| 6,074,299 | A | 6/2000 | Cohen | |
| 6,076,077 | A | 6/2000 | Saito | |
| 6,081,278 | A | 6/2000 | Chen | |
| 6,085,195 | A | 7/2000 | Hoyt et al. | |
| 6,085,249 | A | 7/2000 | Wang et al. | |
| 6,088,702 | A * | 7/2000 | Plantz et al. | 1/1 |
| 6,097,389 | A | 8/2000 | Morris et al. | |
| 6,102,406 | A | 8/2000 | Miles et al. | |
| 6,102,796 | A | 8/2000 | Pajitnov et al. | |
| 6,109,923 | A | 8/2000 | Rothenberg | |
| 6,123,362 | A | 9/2000 | Squilla et al. | |
| 6,144,726 | A | 11/2000 | Cross | |
| 6,147,742 | A | 11/2000 | Bell et al. | |
| 6,169,544 | B1 | 1/2001 | Onoda | |
| 6,178,258 | B1 | 1/2001 | Sugimoto | |
| 6,202,061 | B1 | 3/2001 | Khosla et al. | |
| 6,215,526 | B1 | 4/2001 | Barton et al. | |
| 6,216,112 | B1 | 4/2001 | Fuller et al. | |
| 6,222,947 | B1 | 4/2001 | Koba | |
| 6,224,486 | B1 | 5/2001 | Walker et al. | |
| 6,237,010 | B1 | 5/2001 | Hui et al. | |
| 6,272,231 | B1 | 8/2001 | Maurer et al. | |
| 6,282,330 | B1 | 8/2001 | Yokota et al. | |
| 6,301,555 | B2 | 10/2001 | Hinderks | |
| 6,301,586 | B1 | 10/2001 | Yang et al. | |
| 6,312,337 | B1 | 11/2001 | Edwards et al. | |
| 6,313,835 | B1 | 11/2001 | Gever et al. | |
| 6,324,545 | B1 | 11/2001 | Morag | |
| 6,333,752 | B1 | 12/2001 | Hasegawa et al. | |
| 6,336,052 | B1 | 1/2002 | Quellet et al. | |
| 6,340,971 | B1 | 1/2002 | Janse et al. | |
| 6,343,738 | B1 | 2/2002 | Ogilvie | |
| 6,358,341 | B1 | 3/2002 | Bergquist | |
| 6,369,837 | B1 | 4/2002 | Schirmer | |
| 6,396,963 | B2 | 5/2002 | Shaffer et al. | |
| 6,408,301 | B1 | 6/2002 | Patton et al. | |
| 6,411,744 | B1 | 6/2002 | Edwards | |
| 6,434,579 | B1 | 8/2002 | Shaffer et al. | |
| 6,437,797 | B1 | 8/2002 | Ota | |
| 6,437,818 | B1 * | 8/2002 | Ludwig et al. | 348/14.09 |
| 6,441,854 | B2 | 8/2002 | Fellegara et al. | |
| 6,457,045 | B1 * | 9/2002 | Hanson et al. | 709/206 |
| 6,463,468 | B1 | 10/2002 | Buch et al. | |
| 6,469,711 | B2 | 10/2002 | Foreman et al. | |
| 6,484,189 | B1 | 11/2002 | Gerlach et al. | |
| 6,496,851 | B1 | 12/2002 | Morris et al. | |
| 6,509,910 | B1 | 1/2003 | Agarwal et al. | |
| 6,512,570 | B2 | 1/2003 | Garfinkle et al. | |
| 6,522,418 | B2 | 2/2003 | Yokomizo et al. | |
| 6,546,556 | B1 | 4/2003 | Kataoka et al. | |
| 6,571,221 | B1 | 5/2003 | Stewart et al. | |
| 6,571,255 | B1 | 5/2003 | Gonsalves et al. | |
| 6,573,927 | B2 | 6/2003 | Parulski et al. | |
| 6,578,014 | B1 | 6/2003 | Murcko | |
| 6,583,799 | B1 | 6/2003 | Manolis et al. | |
| 6,590,586 | B1 | 7/2003 | Swenton-Wall et al. | |
| 6,636,648 | B2 | 10/2003 | Loui et al. | |
| 6,643,663 | B1 * | 11/2003 | Dabney et al. | 1/1 |
| 6,686,918 | B1 | 2/2004 | Cajolet et al. | |
| 6,914,625 | B1 | 7/2005 | Anderson et al. | |
| 7,810,037 | B1 | 10/2010 | Edwards et al. | |
| 2001/0032229 | A1 | 10/2001 | Hulls et al. | |
| 2001/0034646 | A1 | 10/2001 | Hoyt et al. | |
| 2001/0037205 | A1 | 11/2001 | Joao | |
| 2002/0049786 | A1 * | 4/2002 | Bibliowicz et al. | 707/511 |
| 2002/0052785 | A1 | 5/2002 | Tenenbaum | |
| 2002/0059364 | A1 | 5/2002 | Coulthard et al. | |
| 2002/0118182 | A1 | 8/2002 | Luther Weindorf | |
| 2002/0194081 | A1 | 12/2002 | Perkowski | |
| 2003/0093493 | A1 | 5/2003 | Watanabe et al. | |
| 2003/0163431 | A1 | 8/2003 | Ginter et al. | |
| 2005/0039121 | A1 * | 2/2005 | Cleveland | 715/517 |
| 2005/0283741 | A1 * | 12/2005 | Balabanovic et al. | 715/838 |
| 2008/0109240 | A1 * | 5/2008 | Shear et al. | 705/1 |

OTHER PUBLICATIONS

No Author Known, "Assistive Computer Technology for Windows 98 Training Manual," High Tec Center Training Unit, http://www.htctu.fhda.edu/guides/act98files/act98.htm, 8 pp., 2002.

Yagawa, et al. "The Digital Album: A Personal File-tainment System." IEEE Proceedings of Multimedia '96. pp. 433-439.

(56) References Cited

OTHER PUBLICATIONS

ImageID press release, Jan. 31, 2000, "ImageID announces AtraCam TM: the amusement-photography system for the Internet age".

ImageID press release, dated Jan. 31, 2000, "ImageID's Smart Picture TM: technology to change the way people get their pictures . . . forever".

Web site at http://www.voyeurweb.com dated Jan. 17, 1999, as archived at http://web.archive.org/web/1990117031200/voy/voyeurweb.com/main/Pictures.html.

Armin Bruderlin, et al., "Motion Signal Processing", Sep. 1995, Proceedings of the 22nd Annual Conference on Computer Graphics and Interactive Techinques, pp. 97-104.

"Pictra first to make publishing and sharing photo albums over Internet a snap for PC users; award-winning software offers easy, fun way to create digital photo albums to share over", PictraAlbum, May 12, 1997, Business Wire, www.highbeam.com/library/docfree.asp?,4 pgs.

Robert E. Calem, "Web-Based Photo Albums Let World See Your Slide Show", Aug. 19, 1997, New York Times Company, 3 pgs.

Glenn McDonald, "Pictra Puts Your Photo Album On The Web For Free", Friday, Jun. 13, 1997, PC World, www.pcworld.com/resource/printable/article,aid,4885.00.asp, 2 pgs.

PCT International Searching Authority, Notification of transmittal of the International Search Report or the Declaration, Date of Mailing: Apr. 26, 2001, International Application No. PCT/US01/03825.

U.S. Appl. No. 09/632,535, Non-Final Office Action, mailed Nov. 19, 2003.

U.S. Appl. No. 09/632,535, Final Office Action, mailed May 18, 2004.

U.S. Appl. No. 09/632,535, Non-Final Office Action, mailed Dec. 15, 2004.

U.S. Appl. No. 09/632,535, Final Office Action, mailed Jul. 1, 2005.

U.S. Appl. No. 09/632,535, Non-Final Office Action, mailed Jan. 4, 2006.

U.S. Appl. No. 09/632,535, Final Office Action, mailed Jun. 28, 2006.

U.S. Appl. No. 09/632,535, Non-Final Office Action, mailed Jan. 29, 2007.

U.S. Appl. No. 09/632,535, Final Office Action, mailed Jul. 16, 2007.

U.S. Appl. No. 09/632,535, Non-Final Office Action, mailed Mar. 21, 2008.

U.S. Appl. No. 09/632,535, Final Office Action, mailed Sep. 16, 2008.

U.S. Appl. No. 09/632,535, Non-Final Office Action, mailed Jun. 5, 2009.

U.S. Appl. No. 09/632,535, Final Office Action, mailed Sep. 29, 2009.

* cited by examiner

ONLINE STORY COLLABORATION

RELATED APPLICATIONS

This application is a continuation of Ser. No. 09/632,535 filed Aug. 4, 2000, now U.S. Pat. No. 7,810,037, which is based on a U.S. Provisional Application No. 60/181,841, filed Feb. 11, 2000.

FIELD OF THE INVENTION

This invention relates generally to networked computers, and more particularly to allowing collaboration by users of networked computers.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Sony Electronics, Inc., All Rights Reserved.

BACKGROUND OF THE INVENTION

Collaboration software exists that allows multiple people to contribute to a single document through a network such as the Internet. However, typical collaborative software provides only review and revision functions for existing documents and offers no capability for the multiple users to collaborate in creating an entirely new document online. Furthermore, the type of content that can be contributed to an existing document by the multiple users is limited.

SUMMARY OF THE INVENTION

An online collaborative story system creates a story from content received from multiple collaborators. The content from each collaborator relates to an element of the story defined in a story concept supplied by an originator. The originator also designates himself or one or more of the collaborators as an editor for the story. The editor decides what content contributed by the collaborators will be accepted for inclusion in the story. The finished story is published for either public access or for private access by only the originator and collaborators. In another aspect, the content contributed by the collaborators is reviewed in light of pre-determined standards and content that does not meet the standards is deleted. Additionally, the originator and/or collaborators may be rewarded for participating in the creation of the story.

Because the invention starts the story creation process with only a story concept, the collaborators are given more creative freedom to craft the finished story than a system that only allows revisions to an existing document. If multiple people contribute different content for the same element, the editor can combine the different content. When the story concept is a single scene, a collaborator contributes content for a scene that begins where the last posted scene ends. Multiple types of content can be contributed to the story, including text, graphics, still images, video, audio and/or a mix of multimedia data types. Thus, the completed story may take different forms, such as a movie with both audio and video content, an audio-only story, a text-only story, or a text story with still image illustrations.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
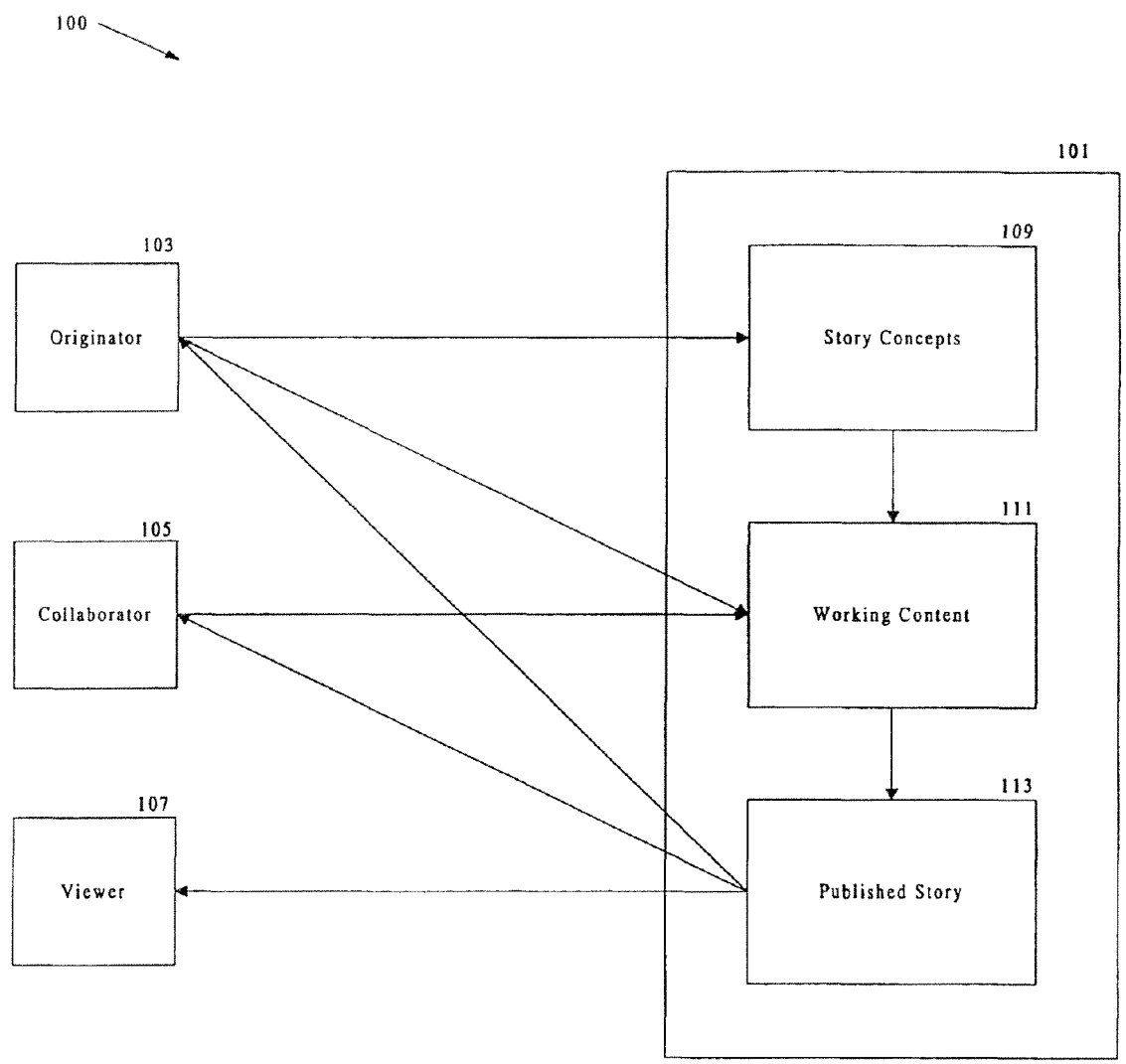
FIG. 1A is a diagram illustrating an overview of the operation of an embodiment of an online collaborative story system according to the invention.

Beginning with an overview of the operation of the invention, FIG. 1A illustrates one embodiment of an online collaborative story system 100. An originator 103 submits a story concept to a collaborative story server computer 101 to be posted in a story concepts area 109. The story concept may be in the form of a storyboard containing a sequence of scenes, a series of chapter synopsis, a set of characters and a potential plot line, a starting scene, or other type of data structure that indicates the subject matter of the story. The story concept also specifies the types of content that will be used to create the story including text, graphics, still images, video, audio and/or a mix of multimedia data types. One or more collaborators 105 choose a story concept from the story concepts area 109 and upload content appropriate for the chosen the story to the working content area 111. The uploaded content is associated with an element of the chosen story, such as a scene in a storyboard, a chapter in a book, a character, or a scene that follows an already existing scene. The originator 103 may also act as a collaborator by uploading content to the working content area 111. The content contributed by the collaborators may be different, e.g., one collaborator may supply an image for a scene while a second collaborator provides text related to the image.

The originator, or one or more collaborators, acts as an editor to decide what portions of the uploaded content will be used in the story. When multiple collaborators act as editors, a periodic vote will be taken on the content that exists in the working content area 111. Once the story is finished, the story is posted to a published story area 113 where it may be publicly available for another other users, i.e. viewer 107.

Alternatively, the finished story can be published as a private story in the published story area 113 so that only the originator 103 and collaborators 105 can view it.

Figure 1B:
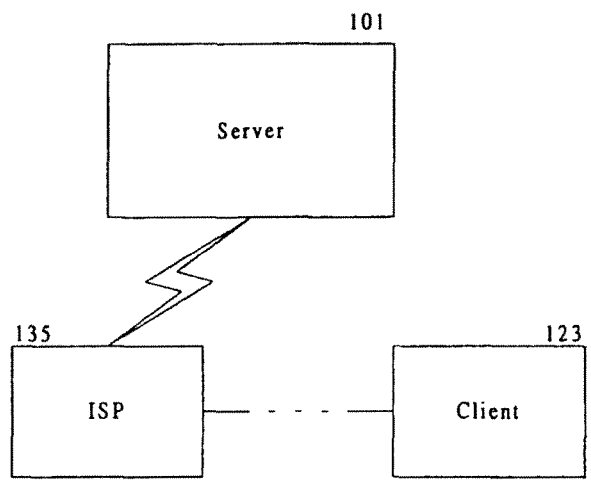
FIGS. 1B and 1C are diagrams of a computer environment suitable for practicing the invention.

In one embodiment, as shown in FIG. 1B, the collaborative story server computer 101 hosts a collaborative story web site and is part of, or coupled to, an ISP (Internet Service Provider) 135 to provide the story content over the Internet. Client computers 123 for the originator 103, the collaborator 105 and the viewer 107 execute a conventional Internet browsing application to exchange data with the server 101. It is readily apparent that the present invention is not limited to Internet access and Internet web-based sites; directly coupled and private networks are also contemplated. In this embodiment, an administrator of the web site may set rating criteria for story concepts and uploaded content to prevent the posting of information which may be offensive to some users.

Figure 1C:
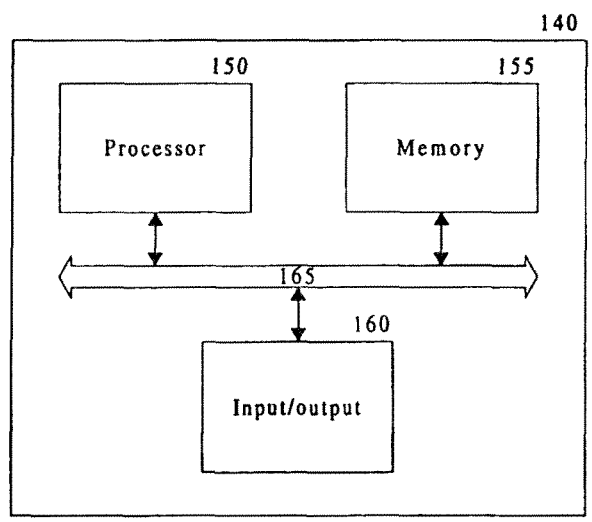

One embodiment of a computer system suitable for use as the collaborative story server computer 101 is illustrated in FIG. 1C. The computer system 140, includes a processor 150, memory 155 and input/output capability 160 coupled to a system bus 165. The memory 155 is configured to store instructions which, when executed by the processor 150, perform the methods described herein. The memory 155 may also store data and content related to the stories. Input/output 160 provides for the delivery and display of the content of the story or portions or representations thereof. Input/output 160 also encompasses various types of computer-readable media, including any type of storage device that is accessible by the processor 150. One of skill in the art will immediately recognize that the term "computer-readable medium/media" further encompasses a carrier wave that encodes a data signal. It will also be appreciated that the server 101 is controlled by operating system software executing in memory 155. Input/output and related media 160 store the computer-executable instructions for the operating system and methods of the present invention as well as the data and content related to the stories.

The description of FIGS. 1B-C is intended to provide an overview of computer hardware and other operating components suitable for implementing the invention, but is not intended to limit the applicable environments. It will be appreciated that the computer system 140 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

As an example, assume the originator and collaborators are fans of a particular television series. The originator posts the final scene of one episode and the first scene of the next episode and the collaborators contribute content that suggests what the characters were doing in between the two episodes. The editor(s) then determine which of the content should be used. In this instance, the story line continues from episode to episode so the content is published at various points in time since the story is never truly "finished."

Thus, an online collaborative story system allows multiple people to contribute to a story by supplying content of various types to a server computer, where it is edited to create the finished story. The completed story may take the form of a movie, or it may be a text story with still image illustrations. When the story concept is posted as a single scene, a collaborator contributes content for a scene that begins where the last posted scene ends. If multiple people contribute different content for the same scene, the resulting scene may be a combination of the different content. The originator can also serve as a director, giving the collaborators particular assignments, such as a story chapter or the characteristics of a story character. Additionally, more than one person can contribute to the story concept either before or after it is posted on the server.

Furthermore, the owner of the online collaborative story system may choose to reward originators and collaborators to encourage participation in creating the online stories. The rewards could range from simple recognition on the web site to prizes to cash. One of skill in the art will immediately conceive of many ways to determine the rewards, including votes by viewers of the finished stories, and such alternate embodiments are contemplated as within the scope of the invention.

While the invention is not limited to any particular system configuration, for sake of clarity a simplified server having three distinct story areas has been described. It will be appreciated that the story concepts, working content, and published stories could be divided by topic, age group, content rating (e.g., family verses adult), etc. Furthermore, it is contemplated that private stories, from concept to finished product, are protected from general access through conventional security and authentication processes.

Next, the particular methods of the invention are described in terms of computer software with reference to a series of flowcharts. FIGS. 2A-D illustrate embodiments of three methods that are executed by the collaborative story server 101 of FIG. 1A. The methods constitute computer programs made up of computer-executable instructions illustrated as blocks (acts) 201 until 209 in FIG. 2A, blocks 221 until 231 in FIG. 2B, blocks 241 until 253 in FIG. 2C, and block 261 until 273 in FIG. 2D. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
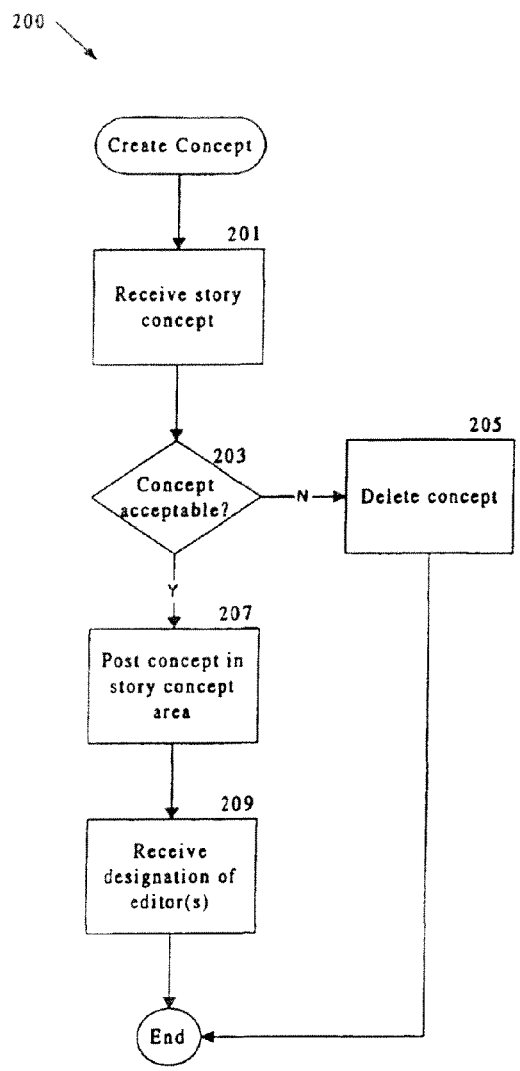
FIGS. 2A-D are flowcharts of methods to be performed by a server computer according to an embodiment of the invention.

Referring first to FIG. 2A, a create concept method 200 is executed by the collaborative story server to create a story concept in the story concept area. The server receives a story concept from the originator (block 201), and the method 200 optionally determines, at block 203, whether the content meets pre-determined acceptance criteria, i.e., a content standard set by the site administrator. If the content is not acceptable, the concept is deleted from the server at block 205. Otherwise, if the story concept is acceptable, it is posted in the story concept area (block 207). The method 200 also receives a list of users that the originator designates as editors for the story concept (block 209). The list may contain one or more specific user identifiers, or may specify that all collaborators are editors.

Figure 2B:
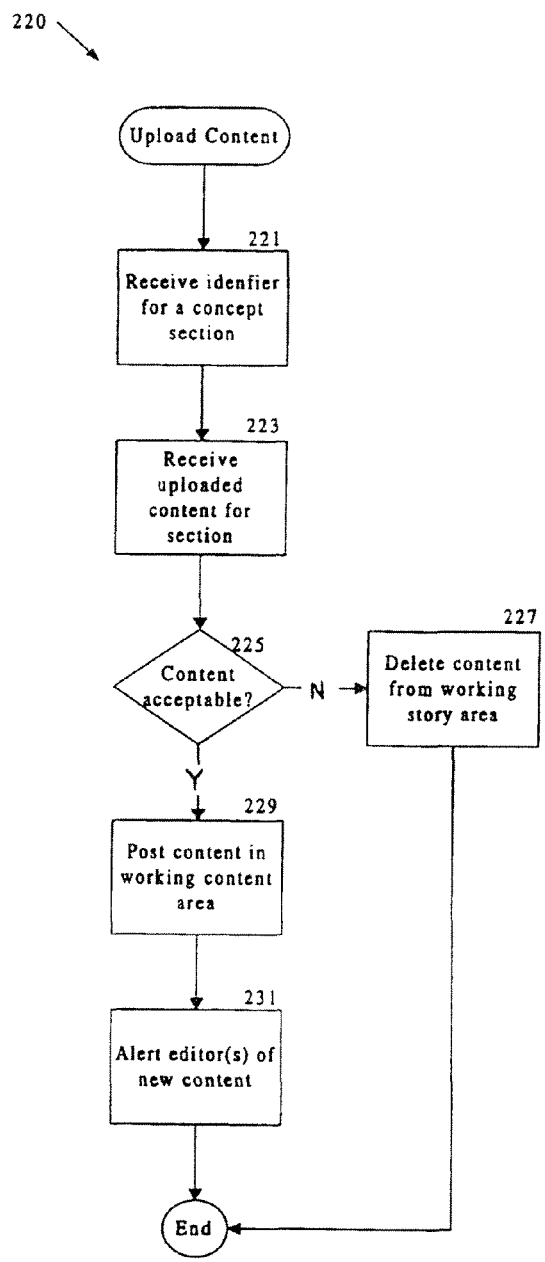

When a collaborator chooses a story concept to contribute to, the server executes an upload content method 220 to post the uploaded content in the working content area as illustrated in FIG. 2B. The server computer receives an identifier from the collaborator that defines a story concept and an element within the concept (block 221) and receives the associated content (block 223). The method 220 optionally determines if the content is acceptable in light of the standards set by the site administrator (block 225), and deletes the content from server if the content is not (block 227). Otherwise, the content is posted in the working content area (block 229) and the editor(s) for the story concept are notified of the new content at block 231.

Figure 2C:
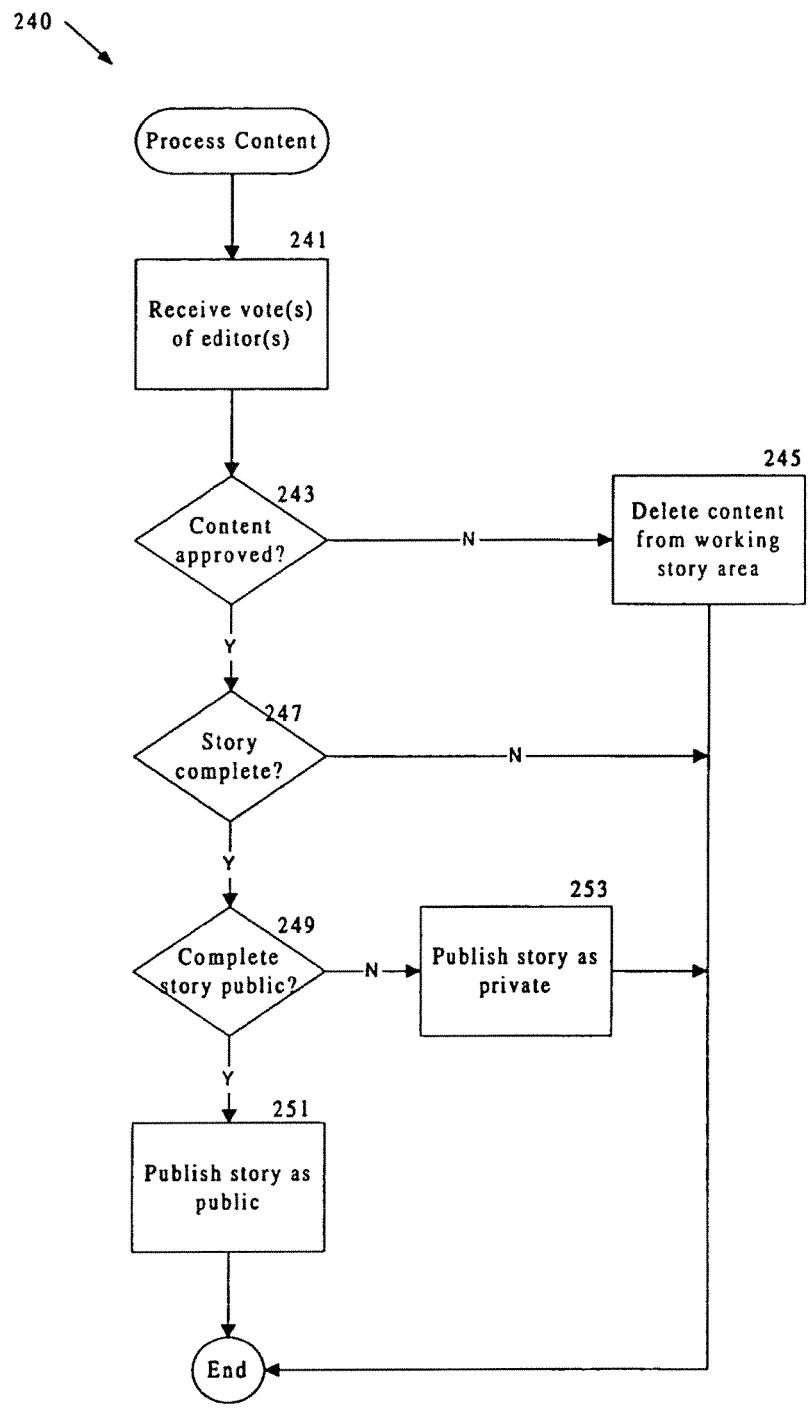

Upon receipt of the notification, the editor(s) send their votes on the new posted content to the collaborative story server, which processes the content as illustrated in FIG. 2C. A process content method 240 executing on the server receives the votes of the editor(s) at block 241 and determines whether the editor(s) have approved the content for inclusion in the story (block 243). If not, the content is deleted from the working story area at block 245 and the method 240 terminates. The method 240 also determines if the story is complete as a result of the newly uploaded and approved content (block 247). When a story is complete, the method 240 determines if the story is to be publicly available to viewers (block 249) and posts the story in the published story area accordingly at either block 251 or 253. If the content is part of a continuing story, such as described in the example above, the content is published at various intervals and in this embodiment, block 247 represents processing that determines if it is time to publish the approved content. In yet another embodiment not shown, content is immediately published after it is approved by eliminating the processing represented by block 247.

Figure 2D:
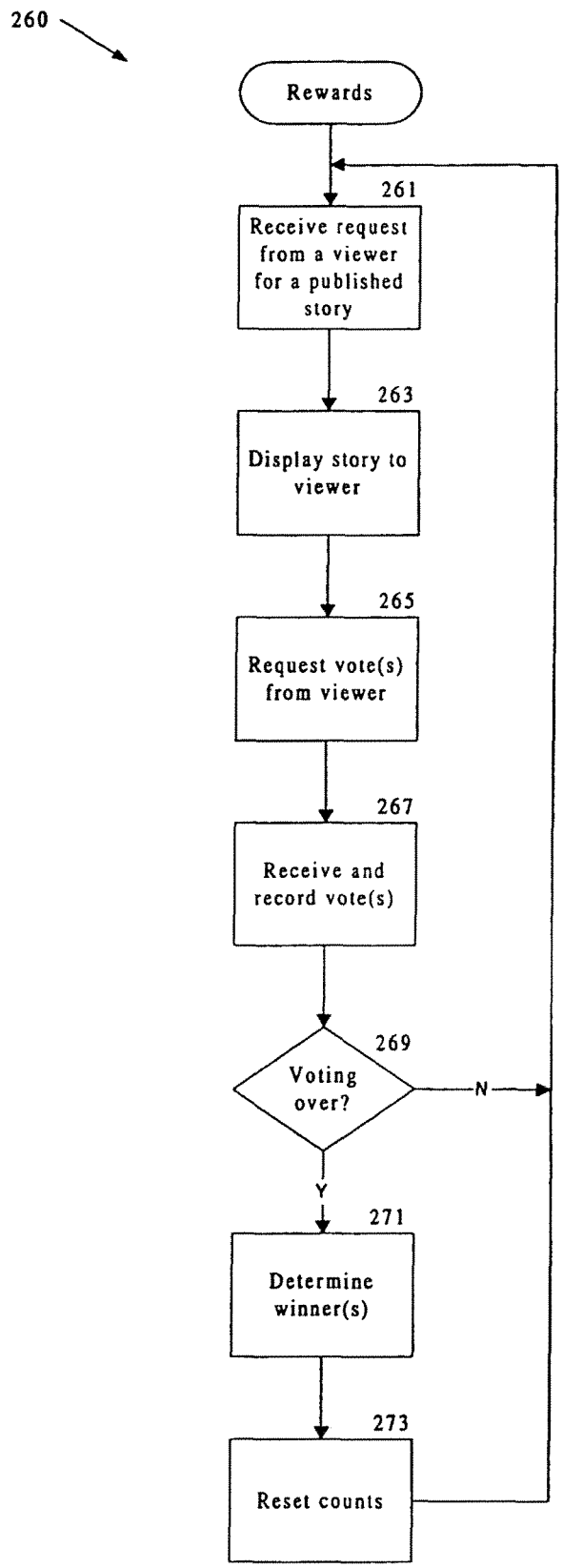

FIG. 2D illustrates an awards method 260 that is executed by the server when the owner of the online collaborative story server chooses to reward originators and collaborators by popular vote. When the server receives a request from a viewer to view a published story (block 261), the method 260 displays the story (block 263) and requests that the viewer vote on the story (block 265). The voting can be in multiple categories, such as story concept, individual pieces of content, continuity between scenes/chapters, characters, etc. The server receives and records the viewer's vote(s) at block 267 and determines if the current voting period is over at block 269. If the voting period is over, the method 260 determines the winners in each category (block 271) and resets the counts for the next voting period (block 273). It will be appreciated that the method 260 can also announce the winner(s) as part of the processing represented by block 271 or the announcements can be made sometime later.

An online collaborative story system has been described that allows multiple people to contribute content to create a story. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while invention as been described in terms of creating a story, it encompasses all types of story media, including pure text, illustrated text, the combination of audio and video, and audio only.

The terminology used in this application with respect to networks is meant to include all of environments in which a server computer communicates with client computers to send and receive data. Therefore, it is manifestly intended that this invention be limited only by the following claims and equivalents thereof.

What is claimed is:

1. A computerized method for creating a story by a plurality of collaborators each capable of supplying story content associated with a story concept over a network, comprising:
    making the story concept available for access over the network to enable the plurality of collaborators to submit competing story content related to at least one element in the story concept;
    accepting the competing story content associated with the story concept from the plurality of collaborators if the received competing story content meets a first predetermined criteria;
    determining a selected story content from the competing story content submitted from each of the plurality of collaborators, the selected story content being approved for inclusion in the story based on communications over the network; and
    creating the story from the selected story content that is approved.

2. The computerized method of claim 1, wherein the determining of the selected story content is conducted by online voting conducted over the network.

3. The computerized method of claim 1 further comprising:
    deleting the accepted competing story content other than the selected story content.

4. The computerized method of claim 3, wherein the accepted competing story content other than the selected story content is deleted automatically without user intervention.

5. The computerized method of claim 1, wherein prior to making the story concept available for access, the method further comprises receiving the story concept for the story, the story concept including an indication of one or more editors that are selected to edit the story.

6. The computerized method of claim 5, wherein after receiving the story concept and prior to making the story concept available for access, the method further comprises determining whether the story concept includes content that meets a second predetermined criteria set by a party separate from the plurality of collaborators and deleting the story concept if the story concept fails to meet the second predetermined criteria.

7. The computerized method of claim 6, where the first predetermined criteria is identical to the second predetermined criteria.

8. The computerized method of claim 5 further comprising:
    notifying the at least one or more editors when the story content from the plurality of collaborators is accepted and posted for review.

9. The computerized method of claim 1 further comprising:
    publishing the story for viewing over the network.

10. The computerized method of claim 2, wherein the on-line voting is performed by one or more editors and at least one of the plurality of collaborators.

11. The computerized method of claim 1, wherein the story content received from a first collaborator of the plurality of collaborators is of a different type than story content received from a second collaborator of the plurality of collaborators.

12. The computerized method of claim 1, wherein the story concept is a fictional story concept.

13. The computerized method of claim 1 further comprising:
   determining a reward for a collaborator of the plurality of collaborators submitting the selected story content.

14. The computerized method of claim 1 being performed by an electronic device comprising a memory that stores software and a processor executing the software to perform operations for creating the story.

15. A non-transitory computer-readable storage medium having computer-executable instructions that, when executed, cause a server computer to perform operations comprising:
   determining whether a fictional story concept includes content that meets a predetermined criteria set by a party different than a plurality of collaborators being users supplying the content associated with the fictional story concept over a network;
   deleting the fictional story concept if the content of the fictional story concept fails to meet the predetermined criteria;
   if the content of the fictional story concept meets the predetermined criteria, making the fictional story concept available for access to enable the plurality of collaborators to electronically submit competing story content related to an element in the fictional story concept;
   accepting the received competing story content associated with the fictional story concept from the plurality of collaborators if the received competing story content meets the predetermined criteria;
   receiving votes over the network from one or more editors in charge of editing a fictional story based on the fictional story concept; and
   including a story content being part of the competing story content if the received votes indicate that the story content is approved.

16. The non-transitory computer-readable storage medium of claim 15 having computer-executable instructions that, when executed, cause the server computer to:
   delete portions of the competing story content that failed to receive votes for approval; and
   publish the fictional story when all content forming the fictional story, including the story concept, is approved.

17. The non-transitory computer-readable storage medium of claim 15 having computer-executable instructions that, when executed, cause the server computer to determine a reward for one or more of the plurality of collaborators.

18. The non-transitory computer-readable storage medium of claim 17, wherein the reward is based on votes from viewers of the fictional story accessed over the network.

19. A computerized system comprising:
   a processor; and
   a memory coupled to the processor, the memory to store information that, when processed by processor, assists in (i) determining whether a fictional story concept includes content that meets a predetermined criteria, (ii) deleting the fictional story concept if the content of the fictional story concept fails to meet the predetermined criteria, (iii) making the fictional story concept available for access over a network if the content of the fictional story concept meets the predetermined criteria so as to enable electronic submission of competing story content related to an element in the fictional story concept, and (iv) monitoring voting conducted over the network so as to include a story content from the competing story content if received votes indicate that the story content is approved or delete the story content if the received votes fail to approve the story content.

20. The computerized system of claim 19, wherein the memory further comprises information that, when processed by the processor, causes the story to be published for public access over the network.

21. The computerized system of claim 19, wherein the memory further comprises information that, when processed by the processor, causes issuance of a request for votes from viewers of the story that have access to the network and to determine a reward based on votes received in response to the request.

* * * * *